US008824684B2

(12) United States Patent
Calcaterra et al.

(10) Patent No.: US 8,824,684 B2
(45) Date of Patent: Sep. 2, 2014

(54) DYNAMIC, SELECTIVE OBFUSCATION OF INFORMATION FOR MULTI-PARTY TRANSMISSION

(75) Inventors: Jeffrey A. Calcaterra, Chapel Hill, NC (US); John R. Hind, Raleigh, NC (US); Abdolreza Salahshour, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 1779 days.

(21) Appl. No.: 11/953,033

(22) Filed: Dec. 8, 2007

(65) Prior Publication Data

US 2009/0147958 A1 Jun. 11, 2009

(51) Int. Cl.
*H04L 9/00* (2006.01)
*H04L 9/08* (2006.01)
*G06F 7/04* (2006.01)
*G06F 17/30* (2006.01)
*H04N 7/16* (2011.01)

(52) U.S. Cl.
USPC .............................. 380/278; 380/259; 726/27

(58) Field of Classification Search
None
See application file for complete search history.

(56) References Cited

U.S. PATENT DOCUMENTS

| 4,613,901 | A | | 9/1986 | Gilhousen et al. | |
| 6,002,768 | A | * | 12/1999 | Albanese et al. | 713/175 |
| 6,266,418 | B1 | | 7/2001 | Carter et al. | |
| 6,373,946 | B1 | * | 4/2002 | Johnston | 380/211 |
| 6,823,454 | B1 | | 11/2004 | Hind et al. | |
| 6,826,690 | B1 | | 11/2004 | Hind et al. | |
| 6,832,314 | B1 | | 12/2004 | Irvin | |
| 6,918,039 | B1 | | 7/2005 | Hind et al. | |
| 6,931,532 | B1 | | 8/2005 | Davis et al. | |
| 6,941,459 | B1 | | 9/2005 | Hind et al. | |
| 6,948,066 | B2 | | 9/2005 | Hind et al. | |
| 6,961,849 | B1 | | 11/2005 | Davis et al. | |
| 6,968,453 | B2 | | 11/2005 | Doyle et al. | |
| 6,976,163 | B1 | | 12/2005 | Hind et al. | |
| 6,978,367 | B1 | | 12/2005 | Hind et al. | |
| 6,980,660 | B1 | | 12/2005 | Hind et al. | |
| 7,039,938 | B2 | | 5/2006 | Candelore | |
| 7,069,452 | B1 | | 6/2006 | Hind et al. | |
| 7,380,120 | B1 | * | 5/2008 | Garcia | 713/160 |
| 2005/0157880 | A1 | * | 7/2005 | Kurn et al. | 380/279 |
| 2007/0195960 | A1 | * | 8/2007 | Goldman et al. | 380/286 |
| 2007/0239994 | A1 | * | 10/2007 | Kulkarni et al. | 713/189 |

* cited by examiner

*Primary Examiner* — Kambiz Zand
*Assistant Examiner* — Trong Nguyen
(74) *Attorney, Agent, or Firm* — Marcia L. Doubet

(57) ABSTRACT

Selectively obfuscating, or obscuring, a portion or portions of information in a multi-party transmission. A user participating in a multi-party exchange signals a communication device (or proxy) that he will provide private information that is to be perceptible only to a subset of the other participants. This user also identifies that subset, preferably by providing a group identifier for a group in which that subset of participants are members. The communication device transmits a member-specific descriptor comprising an encrypted version of a group key, and uses this group key to encrypt the private information that is to be perceptible only to the subset. Device-specific characteristics of participant devices are used, in addition to user-provided data (such as a user's log-on identifier and/or password), as input to create cryptographic key information. Only participants in the subset can decrypt the encrypted private information; other participants preferably receive a filler pattern instead.

22 Claims, 8 Drawing Sheets

US 8,824,684 B2

DYNAMIC, SELECTIVE OBFUSCATION OF INFORMATION FOR MULTI-PARTY TRANSMISSION

BACKGROUND OF THE INVENTION

The present invention relates to communications security, and deals more particularly with dynamically and selectively obfuscating information for multi-party transmission, whereby selected portion(s) of the information can be obfuscated, or obscured, from at least one of the parties receiving the multi-party transmission.

It is becoming prevalent to conduct business and meetings using so-called "voice over IP" (i.e., voice over Internet Protocol, sometimes referred to as "VoIP") technology. Commonly, a conferencing bridge is provided for establishing and maintaining a conference call with this technology, where each of the participants dials in to this conferencing bridge to participate in the meeting using the conference call. As another approach, participants may communicate using technology whereby multiple audio streams are conferenced together using a Web conferencing offering. (The manner in which such technology enables the conferencing is well known in the art, and accordingly, a detailed discussion thereof is not presented herein.) A significant cost savings may be realized by conducting meetings using conference calls over communication channels in this manner, particularly when the participants are distributed and scattered geographically.

Often, negotiations carried out in this manner lack an aspect of privacy that may be desired by the participants in the conference call meeting. For example, if two different companies have representatives participating in the conference call to negotiate a business contract, and those people are calling in from various locations around the country or even around the world, there may be times during the call when representatives from one of the companies need to exchange thoughts or words that are not appropriate for the other company's representatives to hear—such as proposed adjustments to the price or other terms being negotiated, or perhaps to warn a member of the team that what he is saying is stepping out of line or exceeding his authority or is otherwise inappropriate.

BRIEF SUMMARY OF THE INVENTION

The present invention is directed to selectively obfuscating information in a multi-party exchange or in a multi-party transmission. In one embodiment, this comprises selectively obfuscating information in a multi-party exchange by: obfuscating a segment received from a selected one of a plurality of participants in the multi-party exchange by encrypting the received segment in a manner that enables using cryptographic key information associated with the obfuscated segment to decrypt the obfuscated segment, for each one of the plurality of participants who is identified by the selected one as being permitted to perceive the segment, at a device used by that one for participating in the multi-party exchange and that prevents using the cryptographic key information to decrypt the obfuscated segment, for each remaining one of the plurality of participants who is not so identified, at a device used by that remaining one for participating in the multi-party exchange.

The obfuscated segment is transmitted to each identified one and to each remaining one of the participants, and preferably occurs on a data channel of the multi-party exchange. The cryptographic key information is transmitted to each identified one and to each remaining one of the participants, and preferably occurs on a control channel of the multi-party exchange. It may happen that at least one segment received from one of the plurality of participants of the multi-party exchange is not obfuscated, and such segments are therefore perceptible to all other ones of the plurality of participants.

Preferably, the cryptographic key information comprises a symmetric key that is recoverable, for decrypting the obfuscated segment, at the device used by each of the participants who is identified by the selected one but is not recoverable at the device used by any of the remaining participants who are not so identified. The obfuscating may occur responsive to receiving, from a device used by the selected one for participating in the multi-party exchange, a signal indicating that the segment is to be obfuscated. Each identified one of the participants may perceive the segment, responsive to using the cryptographic key information to decrypt the obfuscated segment, and each remaining one of the participants who is not identified by the selected one may be provided with a filler pattern to perceive in place of perceiving the segment.

The segment may be a vocal utterance and the multi-party exchange may be a multi-party voice communication, in which case the obfuscating may occur responsive to receiving, from a phone device used by the selected one for participating in the multi-party voice communication, a signal indicating that the segment is to be obfuscated. The segment may be a typed message and the multi-party exchange may be a multi-party chat session. The segment may be a spoken message and the multi-party exchange may be a multi-party push-to-talk communication. The segment may be a portion of a text file and the multi-party exchange may be a transmission of the text file to multiple parties. The segment may be a portion of a subscription feed and the multi-party exchange may be a transmission of the subscription feed to multiple parties.

In another embodiment, the present invention comprises an obfuscating segment received, from a selected one of a plurality of participants in a multi-party exchange, on a communication channel used for the multi-party exchange; and an encryptor for encrypting the received segment in a manner that enables a decryptor using cryptographic key information associated with the obfuscated segment to decrypt the obfuscated segment, for each one of the plurality of participants who is identified by the selected one as being permitted to perceive the segment, at a device used by that one for participating in the multi-party exchange and that prevents a decryptor using the cryptographic key information from decrypting the obfuscated segment, for each remaining one of the plurality of participants who is not so identified, at a device used by that remaining one for participating in the multi-party exchange.

In another embodiment, the present invention comprises selectively obfuscating information in a multi-party transmission by determining a subset of a plurality of participants in the multi-party transmission who are to receive, in a perceptible form, a private segment of the information in the multi-party transmission; obfuscating the private segment by encryption using a group encryption key corresponding to the subset; encrypting a copy of the group encryption key for each of the participants in the subset, such that the group encryption key is only recoverable by the participants in the subset from that participant's encrypted copy and is not recoverable, from any of the encrypted copies, by any of the participants not in the subset; and transmitting the obfuscated private segment, and the encrypted copy for each of the participants, to all of the plurality of the participants in the multi-party transmission, whereby each of the participants in the subset can decrypt the transmitted obfuscated private segment, upon receipt thereof, using the group encryption key recovered by that participant but none of the participants not in the subset can decrypt the transmitted obfuscated private segment upon receipt thereof.

The encrypting of the copy of the group encryption key for each of the participants in the subset preferably uses, for each of the participants in the subset, information which corresponds to a device currently used by that participant and which is not transmitted to any of the participants in the multi-party transmission, thereby enabling the participant to recover the group encryption key from that currently-used device. The information which corresponds to the currently-used device preferably comprises a private obfuscation key that is securely stored on the device, and a public obfuscation key that is cryptographically associated with the private obfuscation key is preferably used in the encrypting of the copy of the group encryption key, enabling the encrypted copy to be recovered by the participant currently using the device.

The obfuscated segment may have associated therewith an expiration timestamp, and the transmitted obfuscated segment then cannot be decrypted by any of the participants in the multi-party transmission after the expiration timestamp expires.

Embodiments of the present invention may be provided as method, systems, and/or computer program products. It should be noted that the foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined by the appended claims, will become apparent in the non-limiting detailed description set forth below.

The present invention will be described with reference to the following drawings, in which like reference numbers denote the same element throughout.

DETAILED DESCRIPTION OF THE INVENTION

Figure 1:
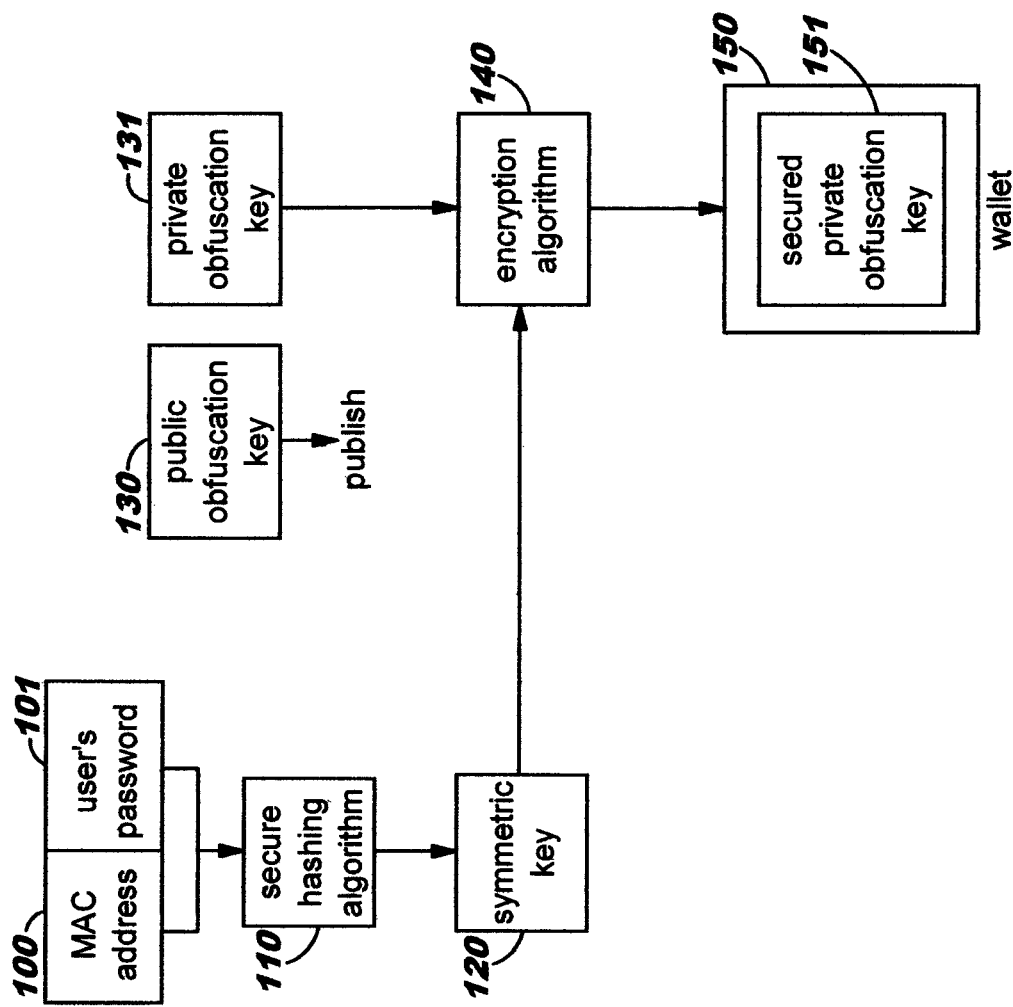
FIG. 1 illustrates use of hardware characteristics and user log-on credentials with algorithms for securely storing a private obfuscation key in a client-side wallet, according to an embodiment of the present invention.

An embodiment of the present invention is directed toward dynamically selecting and obfuscating multi-party voice transmission over a communication channel, and is described herein (by way of illustration but not of limitation) as obfuscating multi-party voice over IP communications. As discussed earlier, there is often a need to have private discussions between selected participants (also referred to herein as "users" or "team members", for ease of reference) in a conference call. If all of the users who need to participate in a private discussion are located in the same conference room, then it is relatively easy to perform this type of private discussion by pressing a "mute" button on the conference calling equipment; this approach is well known in the art. However, as distributed communications such as voice over IP become more prevalent, it is often the case that the conference call participants are widely dispersed geographically. Using techniques disclosed herein, a group of participants can achieve private communications during a multi-party exchange over a communication channel, whereby at least one of the other participants in the multi-party exchange cannot hear the private communication. (In contrast with known techniques, these users who achieve the private communications are not in a single room conversing among themselves; instead, they are located in at least two different locations, as will be discussed.)

An embodiment of the present invention enables a conference call participant to signal that his next utterances should be heard only by a particular identified subset of the participants. All others will hear a filler sound pattern or perhaps no sound pattern, according to a preferred embodiment. For example, those others might hear a muffled voice pattern (which, notably, is a prerecorded sound pattern and not the voices from the private communication); as other examples, these others might hear white noise or simply silence as the filler sound pattern.

The term "obfuscation", as used herein, refers to the concept of concealing the meaning of communication by making it more confusing and/or harder to interpret. Accordingly, the private exchange provided by an embodiment of the present invention is obfuscated (also referred to herein as "obscured") with regard to the conference call participants who are not members of the particular identified subset of participants that are selected as those intended to hear the private exchange.

According to an embodiment of the present invention, encryption is used to mask selected portion(s) of a transmission, so that the encrypted portion(s) cannot be understood by the non-selected participants, yet the encrypted portion(s) will be understandable (i.e., by decryption) for the selected participants. Notably, this result is achieved even though both groups are participating in the same communication over the multi-party communication channel. This encryption or masking of portion(s) of a conference call is also referred to herein as "selective encryption", "selectively obscuring", or "selectively obfuscating" (and for ease of reference, "portion" is used hereafter in the singular, although it will be understood that an embodiment may provide for masking more than one portion of a particular communication).

Techniques disclosed herein may be used for selectively obfuscating or obscuring other types of information, beyond voice transmission over a communication channel. As one example, these techniques may be used to selectively obscure white-board updates in a web conference. As another example, techniques disclosed herein may be used to selectively obscure messages in a multi-party chat session carried out using a communication network. As a still further example, techniques disclosed herein may be used to selectively obscure voice communication in a push-to-talk mobile network. As yet another example, the disclosed techniques may be used to selectively obscure events in log files. (These examples will be discussed in more detail below.) Accordingly, the scope of the present invention is not limited to voice transmission over a communication channel.

In a preferred embodiment, the encryption scheme does not require a deep support infrastructure (e.g., of the type needed for security certificates in a public key infrastructure), yet it supports a combination of device-dependent data from a user's device and user-provided data. According to an embodiment of the present invention, the device-dependent data may be obtained prior to, and/or at the time of, connecting the device to the communication channel, and the user-provided data is preferably obtained after establishing the connection. The user-provided data preferably comprises information identifying the user (for example, a user password and/or a user identifier or "ID"), and obtaining the user-provided data may comprise accessing such information from the user's device when the user initiates a connection for the multi-party exchange. Hereinafter, the user-provided data is referred to as user log-on credentials (although this is by way of illustration of the user-identifying information, and not of limitation). Using a combination of device-dependent data and user-provided data in the manner disclosed herein is designed to make breaking the encryption more difficult. In addition, an embodiment of the present invention preferably treats the combination of device-dependent data and user-provided data as uniquely identifying a particular participant.

Using techniques disclosed herein, a portion or segment (where those terms are used interchangeably herein) of a communication is obscured from unintended recipients by performing segment-level encryption (and subsequent decryption) in conjunction with a relatively simple key exchange that uses device-specific characteristics (i.e., the device-dependent data discussed above) along with the identifying information for the users in a multi-party exchange. For an embodiment that does not use voice communication (e.g., an embodiment directed toward obscuring information in a log), the segment-level encryption obscures the segment from viewing or other perception by unintended recipients.

In an embodiment of the present invention, a device with which a user participates in a multi-party voice exchange is preferably a cell phone or other digital device capable of providing voice functions, such as a computer with voice card or other voice transmission capability. The user's device may be used to initiate the obscuring of a segment and to identify the particular subset of participants who will receive the unobscured (via decryption) segment, as will be discussed in more detail below. The user's device may also be used to signal termination of the obscuring, after which the multi-party voice exchange then becomes audible to all participants. Use of the user's device for carrying out these functions will be discussed in further detail below. In scenarios where the user's device is not equipped to perform encrypting and obscuring (as may happen when the user's device is a legacy telephone, for example), a device proxy adapted for performing these functions may be used in connection with the user's device (or perhaps may be provided as a function of the conferencing bridge, and the user's device may connect to this function using a proxy port or other technique).

Alternative embodiments include, as noted earlier, real-time applications such as selectively obscuring white-board operations in a web conference or selectively obscuring messages in a multi-party chat session, and non-real-time applications such as selectively obscuring event attributes recorded in a log or selectively obscuring objects in an RSS ("really simple syndication") feed or other subscription service.

A control channel is used, in an embodiment of the present invention, to transmit data comprising key obfuscation material. For media where a control channel is not natively available, a logical control channel may be created. This may comprise, for example, using a multiplexer function on streamed data (as defined, for example, in the well-known MPEG-4 standard for audio and video data) or by extending the natural data encoding. As an example of the latter, an embodiment of the present invention may provide a logical control channel by using a special namespace definition for an XML-encoded log file, where this special namespace defines syntax elements that will carry information pertaining to encrypted segments of the data in the log file. Adding this namespace to an XML-encoded file enables the file to contain the additional control channel information of the type disclosed herein, such that the control channel information will be available to receivers of the encoded file. In one approach, encrypted data may be embedded in an XML file using base64 encoding, for example by specifying an element such as "<data encoding="base64"> . . . </data>". In this approach, the encrypted keys may be passed using standard encoding within the namespace of the control channel, and cannot be cracked by an unintended recipient who can see the XML markup of the control channel. (As is well known, "MPEG" is an abbreviation for "Motion Picture Experts Group" and "XML" is an abbreviation for "Extensible Markup Language".)

Notably, it is not necessary that the multi-party infrastructure (such as the conferencing bridge) be aware of the control channel or the data segmentation (i.e., comprising segments of encrypted data which may be intermingled with unencrypted segments).

An embodiment of the present invention also uses a value that is known to all of the participants in the multi-party exchange. In a conference call scenario, this known value may be the call-in passcode. Accordingly, this known value is referred to hereinafter as the "multi-party PIN". As one alternative, the known value may be randomly generated, for example at set-up of the control channel, and communicated to each party that participates in the multi-party exchange. Preferably, the known value is a relatively short value.

Each endpoint device in the multi-party exchange (e.g., each client device to be used by a participating end user) generates a public/private key pair which are cryptographically associated so as to be usable for public key (i.e., asymmetric) security. This public/private key pair is also referred to herein as the "device obfuscation key pair" or "obfuscation key pair", and the keys of this pair are also referred to as the "public obfuscation key" and the "private obfuscation key". This key pair may, in some embodiments, be a relatively low-strength key pair; however, if the sensitivity of the information to be privately exchanged warrants added computational overhead, an embodiment of the present invention may use a higher-strength key pair. Generation of the obfuscation key pair may be triggered when the device is registered for participating in a multi-party exchange (as discussed below) or by other means (and the obfuscation key pair may, in one approach, already exist before the registration process begins).

The private key from this key pair is securely stored, according to a preferred embodiment, in a wallet on the client (i.e., end user) device, where this secure storage comprises protecting the private obfuscation key by encryption based on a secure hash value computed over various hardware characteristics and user log-on credentials. Examples of the hardware characteristics include an assigned phone number of a cell phone (stored, for example, in a SIMM, or "single inline memory module", card of the phone); a data link layer or MAC ("media access control") address or other unique identifier of a network adapter in a computing device; a processor ID of a client device; and so forth. Examples of user log-on credentials include the user's log-on password or a PIN ("personal identification number") used to log on to this particular device. Preferably, at least one hardware characteristic is used in combination with at least one user log-on credential, and these values are concatenated in a known sequence. A secure hash value is then computed (using a hashing algorithm) over the concatenated values. This hash value is preferably used as a symmetric (i.e., shared) key for input to an encryption algorithm which encrypts the private obfuscation key for storage in the wallet. (Concepts of hashing, asymmetric and symmetric keys, and encryption/decryption using such keys are well known to those of skill in the art, and therefore a detailed discussion of these concepts is not presented herein.)

See FIG. 1, illustrating use of the hardware characteristics and user log-on credentials (comprising a MAC address 100 and user password 101, in this example) as input to a secure hashing algorithm 110 to compute a symmetric key 120; using the symmetric key 120, along with the private obfuscation key 131 for this device, as input to an encryption algorithm 140 to create an encrypted version 151 of the private obfuscation key; and securely storing the private obfuscation key in the client-side wallet 150 (i.e., storing the encrypted version 151 in the wallet 150).

The public obfuscation key 130 corresponding to this securely-stored private obfuscation key is published in conjunction with an ID of the device user. This publishing may comprise, for example, storing the information in a shared address book, in a shared buddy list of an instant messaging ("IM") application, in an enterprise directory, in a conference call manager repository, and/or in a web conference manager file; using DNS ("domain name server") or DHCP ("dynamic host configuration protocol") attributes to record the published information; broadcasting the public obfuscation key and corresponding user ID over the multi-party channel; and so forth.

Because a device may have more than one user (such as a phone located in a common area associated with a company or department within a company), the device may securely store the private obfuscation key for more than one user. In this case, the hashing 110 and encryption 140 approach illustrated in FIG. 1 is preferably repeated for each such user. Accordingly, the log-on credentials corresponding to the device's current user (which log-on credentials may be obtained using known techniques) are used at 101 of FIG. 1, and therefore the symmetric key 120 will be different for each user of this particular device. This enables the wallet 150 to securely store a copy of the private obfuscation key 131 for multiple users, where each copy is encrypted by a different (user-specific) symmetric key 120; a particular user's copy of private obfuscation key 151 is therefore accessible to that user without allowing other device users to retrieve that copy of the private obfuscation key.

Suppose a participant to a multi-party voice exchange wants to obscure some utterance from a subset of the other participants in the multi-party voice exchange, or in another embodiment, wants to obscure some portion of video, image, or textual data from perception by parties outside a group of intended recipients of that portion. The intended recipients of the information that is obscured (i.e., of the underlying information) are identified as group members, according to an embodiment of the present invention, and a group key is created for this group. Preferably, the group key is created as a symmetric key (and may be created, for example, using a pseudo-random number generator or other known technique). A data structure referred to herein as a "descriptor" is also built for each group member. An embodiment of the present invention stores, in the descriptor for a particular group member, an ID of that group member and an encrypted copy of the group key, where this encrypted copy has been encrypted using that group member's public obfuscation key. (In some cases, a group may have a single member.)

Figure 2:
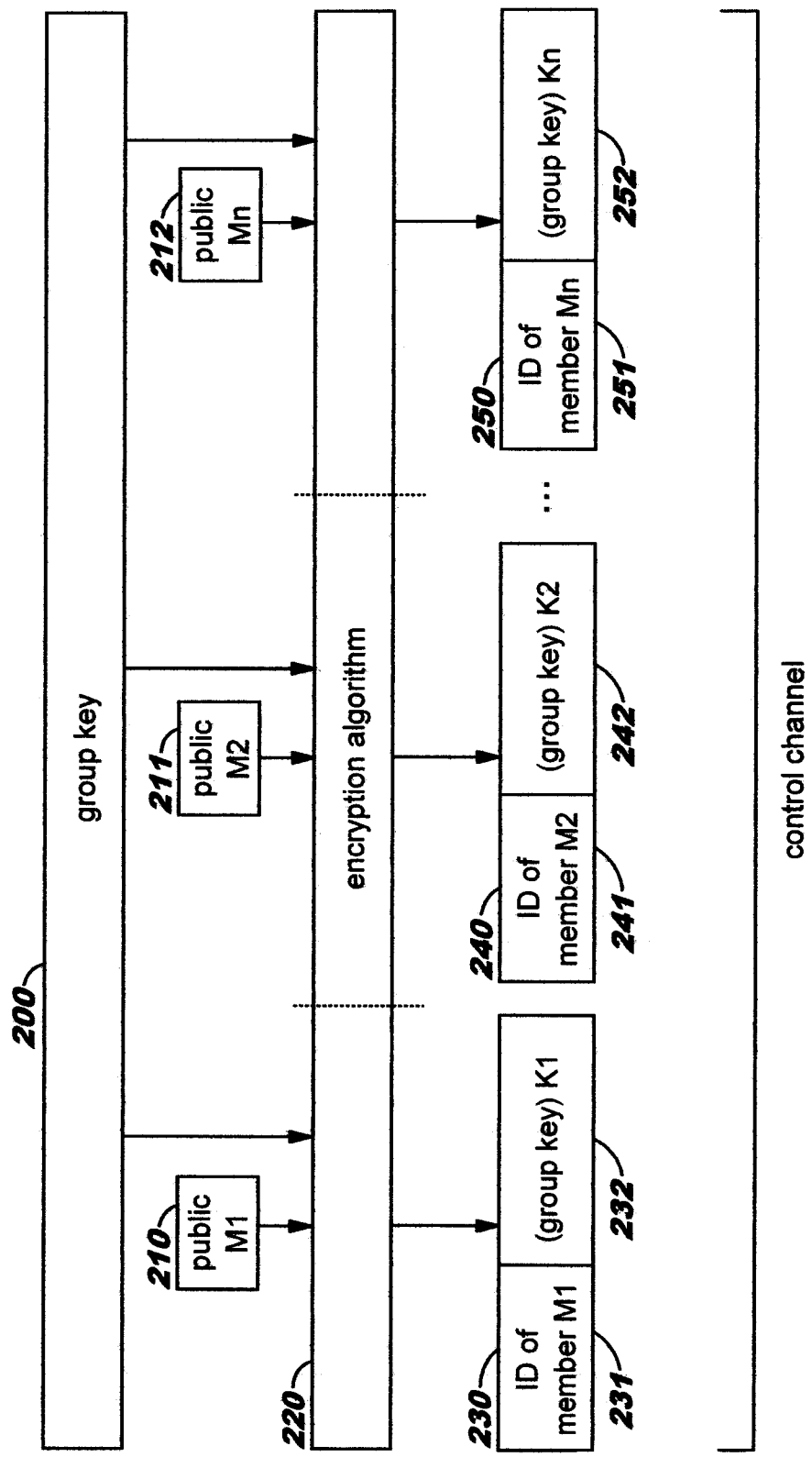
FIG. 2 illustrates using a group key in combination with a public obfuscation key of each group member as input to an algorithm for creating an encrypted version of the group key in a descriptor created for each group member, where these descriptors are to be transmitted on a control channel of a multi-party exchange, according to an embodiment of the present invention.

See FIG. 2, which illustrates using the group key 200 in combination with a public obfuscation key 210, 211, 212 of a group member as input to an encryption algorithm 220, thereby creating an encrypted version 232, 242, 252 of the group key for each of the group members, and storing those encrypted versions 232, 242, 252 in a descriptor 230, 240, 250 that corresponds to each of the group members. The descriptors 230, 240, 250 are preferably concatenated into a single data structure for transmission on the control channel.

When a segment is obscured, the descriptors for each member of the group of intended recipients of that segment are sent on the control channel while the obscured segment is sent on the data channel. Notably, the set of descriptors for the group of intended recipients can be sent to any participant of the multi-party exchange without comprising the security of the obscured segment (or of the secured group keys in those descriptors). This is because each group member can use his private obfuscation key to decrypt the group key from his own descriptor (and can then use this group key when decrypting the obscured segment, as described below), but no other member of the group can decrypt another member's copy of the group key and parties who are not members of the group cannot decrypt the group key from any of the group's descriptors. (As will be obvious, references herein to a participant or user encrypting, decrypting, or recovering information are a shorthand reference for the participant's device or user's device performing those functions.)

In an embodiment of the present invention, the obscured segment sent on the data channel is encrypted using a key as input to an encryption algorithm, where this key is preferably a symmetric key computed by securely hashing the multi-party PIN concatenated with the group key that is associated with the group of intended recipients. (Note that the term "segment", as used herein, does not infer a particular packet or message size for transmission, but instead comprises however many packets or messages are required for transmitting the individual obscured exchange created by a particular speaker.) In a voice exchange, securing the segments on the data channel in this manner protects the voice transmissions that occur on that channel until such time as the obscuring is terminated.

Figure 3:
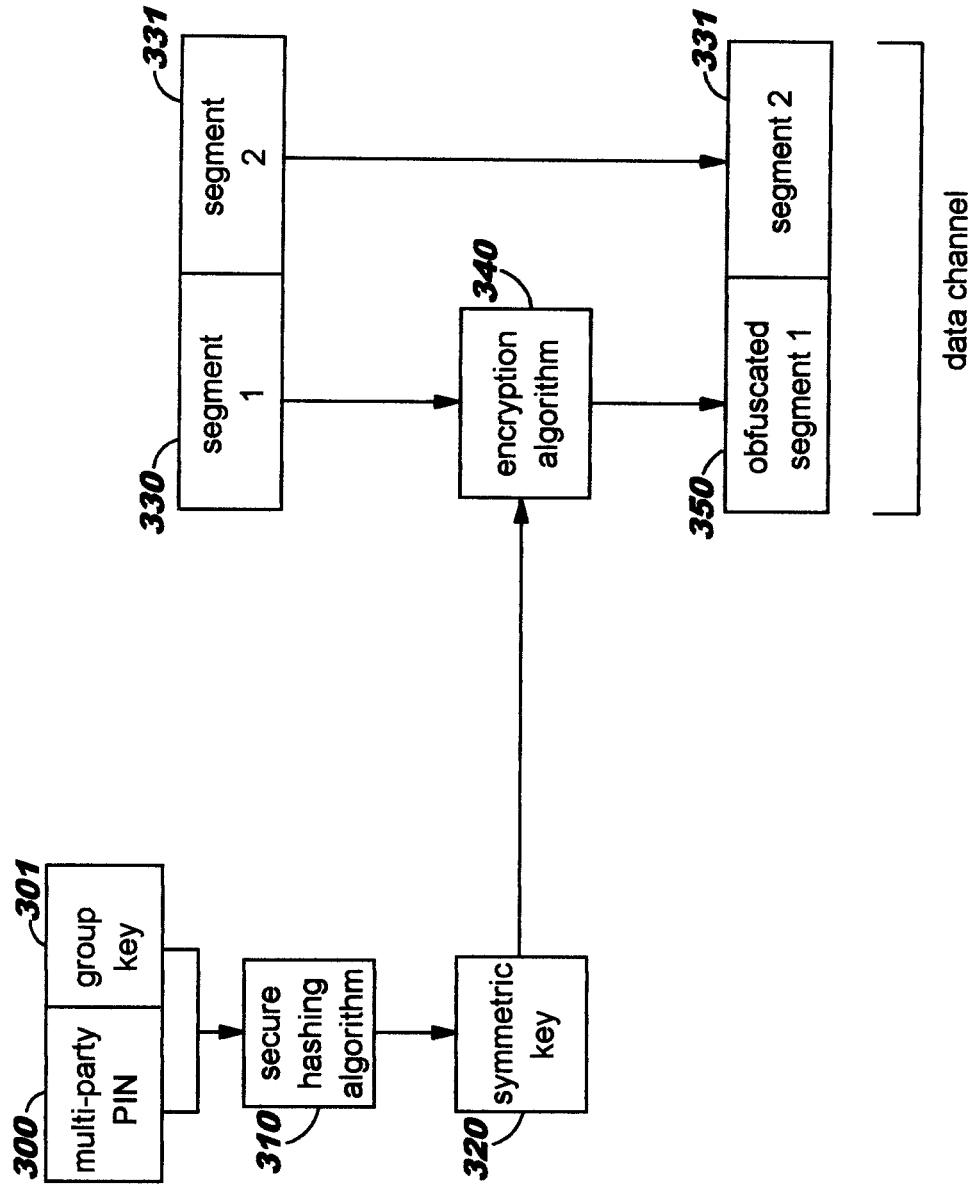
FIG. 3 illustrates encrypting a segment of the multi-party exchange to create an obfuscated segment to be transmitted on a data channel of the multi-party exchange, according to an embodiment of the present invention.

See FIG. 3, which illustrates providing, as input to a secure hashing algorithm 310, the multi-party PIN 300 concatenated with a group key 301 to create a symmetric key 320. This symmetric key 320 is used as input to an encryption algorithm 340 to secure segment_1 330, in this example, thereby creating obfuscated segment_1 350 for transmission on the data channel. Segment_2 331 is not to be obfuscated, in this example, and FIG. 3 therefore shows this segment_2 331 bypassing the encryption algorithm and being sent in its original form on the data channel.

On the receiving side, a recipient of data transmitted on the data channel looks for obscured segments, and if unable to decrypt them, inserts a filler pattern in the data stream in place of each such obscured segment. As noted earlier, examples of a filler pattern for a multi-party voice exchange comprise a recording of muffled voices, white noise, silence, and so forth. In a multi-party chat session, a filler pattern may comprise rendering a black bar as a signal that text has been obscured from the view of this recipient, or perhaps inserting another signal such as "PRIVATE" in place of the obscured text. In a white-board scenario, the filler pattern may comprise providing an animated icon in place of the white-board content that has been obscured from this recipient's perception. In a scenario involving a text-based log file, a filler pattern may comprise inserting "PASSWORD" or other appropriate text in place of a field that cannot be decrypted for this recipient.

Whether a particular recipient device of an obscured segment can decrypt that segment depends on whether that recipient device can recover the group key associated with the group of intended recipients (i.e., intended recipient users) of the segment. Accordingly, in one approach an embodiment of the present invention uses an ID of a user who is currently logged on at the recipient device (i.e., the device receiving the data on the data channel), and compares this ID to the member ID fields in the descriptors (as illustrated by descriptors 230, 240, 250 in FIG. 2) received by that device on the control channel. Upon finding a descriptor with a member ID (e.g., member ID 231, 241, or 251 of FIG. 2) that matches the ID associated with this logged-on user, the recipient device extracts the encrypted group key from that descriptor and decrypts the encrypted group key using the private obfuscation key (which is recovered from the device's wallet, as discussed below) of the recipient device. This recipient device then uses this decrypted group key for decrypting obscured segments received on the data channel.

Because private obfuscation keys are securely stored in wallets, according to an embodiment of the present invention, the private obfuscation key needs to be recovered from the wallet in order to decrypt the encrypted group key from a descriptor (recalling that this encrypted group key was encrypted using a public obfuscation key). As will be understood by reference to the symmetric key encryption technique disclosed in FIG. 1, recovering the private obfuscation key from the wallet comprises concatenating the hardware characteristic(s), illustrated in FIG. 1 as a MAC address of a network adapter associated with the device, to the user log-on credential(s), illustrated in FIG. 1 as the user's password; passing the result through the secure hashing algorithm 110 to thereby recreate the symmetric key 120; and using this recreated symmetric key 120, along with the secured private obfuscation key 151, as input to a decryption algorithm that cryptographically corresponds to encryption algorithm 140. Output of the decryption algorithm is a restored (i.e., unencrypted) version of the original private obfuscation key 131.

A member who uses the correct private obfuscation key and thereby recovers the group key from his descriptor can therefore decrypt an obscured segment which is received on the data channel and which was encrypted using that group key, but a participant who is unable to obtain this group key (i.e., participants who are not members of the group) cannot decrypt that obscured segment. As will be understood by reference to the symmetric key encryption technique disclosed in FIG. 3, decrypting the obscured segment for a particular group member comprises concatenating that member's decrypted copy of the group key 301 to the known multi-party PIN 300; passing the result through the secure hashing algorithm 310 to thereby recreate the symmetric key 320; and using this recreated symmetric key 320, along with an obscured segment 350, as input to a decryption algorithm that cryptographically corresponds to encryption algorithm 340. Output of the decryption algorithm is a restored (i.e., unencrypted) version of the original segment 330, which can then be perceived by the user.

An alternative embodiment may implement a variation of the above-disclosed approach. Several such variations will now be described.

In one variation, a segment time-stamp is associated with an obscured segment, indicating that the segment must be decrypted prior to a particular date/time. In this variation, the decrypting routine further comprises comparing the current date/time to this time-stamp, and suppressing the decrypting of the segment if the time-stamp has already expired.

In another variation, a group key may be reused for multiple obscured segments. In this variation, the descriptors need only be transmitted on the control channel when the group key is changed. Preferably, the group key is changed at regular intervals when using this variation (such as every 30 minutes).

In yet another variation, a particular group member may have more than one member ID for a particular group, each associated with a different device that may be used by this member for participating in a multi-party exchange, and a descriptor may then be created for each such ID. Accordingly, the group member can recover the group key from multiple different devices. For example, the group member may have a first member ID associated with his cell phone, a second member ID associated with the phone in his office, and a third member ID associated with the phone in his home. This member will therefore be able to locate a matching descriptor on the control channel when participating in a multi-party exchange using any of these three phones, and will thereby be able to locate an encrypted copy of the group key when using any of these phones. Note that each of the three phones in this example will have its own wallet in which the phone's private obfuscation key is securely stored by encrypting it with a symmetric key. Because that symmetric key is computed from values that include hardware characteristic(s) which is/are uniquely associated with that particular phone, the symmetric key used at each of the three phones will be different; the password for this particular group member may also be different at each phone. However, any of these phones should be able to recover its private obfuscation key on behalf of this group member and thus decrypt the group key from one of the multiple descriptors created for this group member, thereby enabling the group member to access the obscured segment from any of the three phones (or more generally, from any of a plurality of devices).

In still another variation, information pertaining to the encryption algorithm used to obfuscate data segments may be changed dynamically. This may be done, for example, in an attempt to prevent a hacker from breaking an encryption algorithm (given that repeated use of the algorithm makes it more susceptible to breaking). An identifier of the encryption algorithm (e.g., "3DES" or "BLOWFISH"), length of keying material, or other attribute to be changed is preferably encrypted using a group key in this variation, thereby obfuscating that algorithmic information. The obfuscated information may be transmitted to parties joining the multi-party exchange (and as noted above, any recipient of the obfuscated information that cannot recover the group key cannot recover an unencrypted version of the obfuscated information).

In another variation, a standardized group approach may be used, whereby a particular group member is not actually an individual but is instead a representation for a group of individuals, which may include users having a certain role. For example, suppose it is desired to enable any member of the "Product XYZ" support team who logs on to a service desk console application using a device associated with a particular MAC address to participate in a private communication. A descriptor can be created for each team member who might potentially participate in the multi-party exchange from the device executing the service desk console application (or, in the general case, from a particular device identified with certain hardware characteristics), and those descriptors can be transmitted on the control channel. As a result, any participating team member using this particular device can locate his own descriptor and retrieve the group key (and use that group key for decrypting the obfuscated segment) in the manner described above.

In another variation, a "device group proxy" approach may be used for uniquely identifying a combination of device and caller, and may be used for supporting participation by legacy devices. A database or other repository may be used for persisting information to identify a member ID for a particular person, where this member ID can be used to identify the person without regard to which device is currently being used by that person and without regard to device-specific log on information that may be used. For example, suppose it is desired to enable Jeffrey to participate in a private communication from any workstation in Testing Lab 123 of Building ABC. Jeffrey might log on to a device that is uniquely identified with device characteristic "1A2B . . . " using password "Password_1A2B" and might log on to another device that is uniquely identified with device characteristic "3C4D . . . " using password "Password_3C4D", for example. Or, Jeffrey might prefer to occasionally log on from an ordinary phone. For this latter case, if the phone has caller ID service enabled, then the phone's transmitted caller ID information may be used to uniquely identify Jeffrey as the caller (e.g., by consulting a database or other repository in which the caller ID value is mapped to Jeffrey). Or, a special code might be received from the phone, where this special code can then be used as the unique identifier. As another approach, a device might be placed between the phone and the phone line for uniquely identifying this phone as the participating device and Jeffrey as the participating caller (and this device preferably also performs decryption of the encrypted information described herein). A common member ID may be provided for Jeffrey, such as "JeffreyC", to be used as his member ID when he participates in a call from any of these various devices, by recording entries in a database in association with the common member ID. Each such entry preferably specifies the unique identifier of one of the potential devices and Jeffrey's corresponding log on characteristic for that device. If Jeffrey calls in from his phone, for example, the phone identifier and Jeffrey's log on characteristic can be used to access the entries in this database and if located therein, then Jeffrey's device will be able to recover the group key from a descriptor having a member ID of "JeffreyC". Similarly, if Jeffrey logs on using password "Password_1A2B" to the device having device characteristic "1A2B . . . ", or using password "Password_3C4D" to the device having device characteristic "3C4D . . . ", these combinations of password and device characteristic can be used to access the entries in the database to recover the common member ID of "JeffreyC", enabling Jeffrey's various devices to recover the group key from the descriptor having member ID of "JeffreyC".

In still another variation, group descriptors may be shared outside of a particular multi-party exchange session (e.g., across more than one voice communication, or across different types of multi-party exchanges). For example, suppose it is desired to enable any member of Department A1B2 to participate in a private communication of more than one type, such as a private communication during a conference call and a private communication during a multi-party IM chat session. A descriptor can be created for each department member and each potential device that may be used by that department member. These descriptors may be stored in, or copied to, network cache storage. Suppose user Mary calls in to the conference call from her cell phone, and at the same time is sending messages over a chat session using her workstation device. A first decryption module operating on Mary's cell phone can then use Mary's cell phone identifying information to retrieve, from the network cache, a descriptor where the member ID matches the cell phone identifying information, and a second decryption module operating on Mary's workstation can use her workstation identifying information to retrieve a different descriptor from the cache, where this different descriptor has a member ID matching Mary's workstation identifying information. Or, if Mary has the same identifying information for both her cell phone and her workstation, then the first and second decryption modules will both retrieve the same descriptor for Mary.

Figure 4:
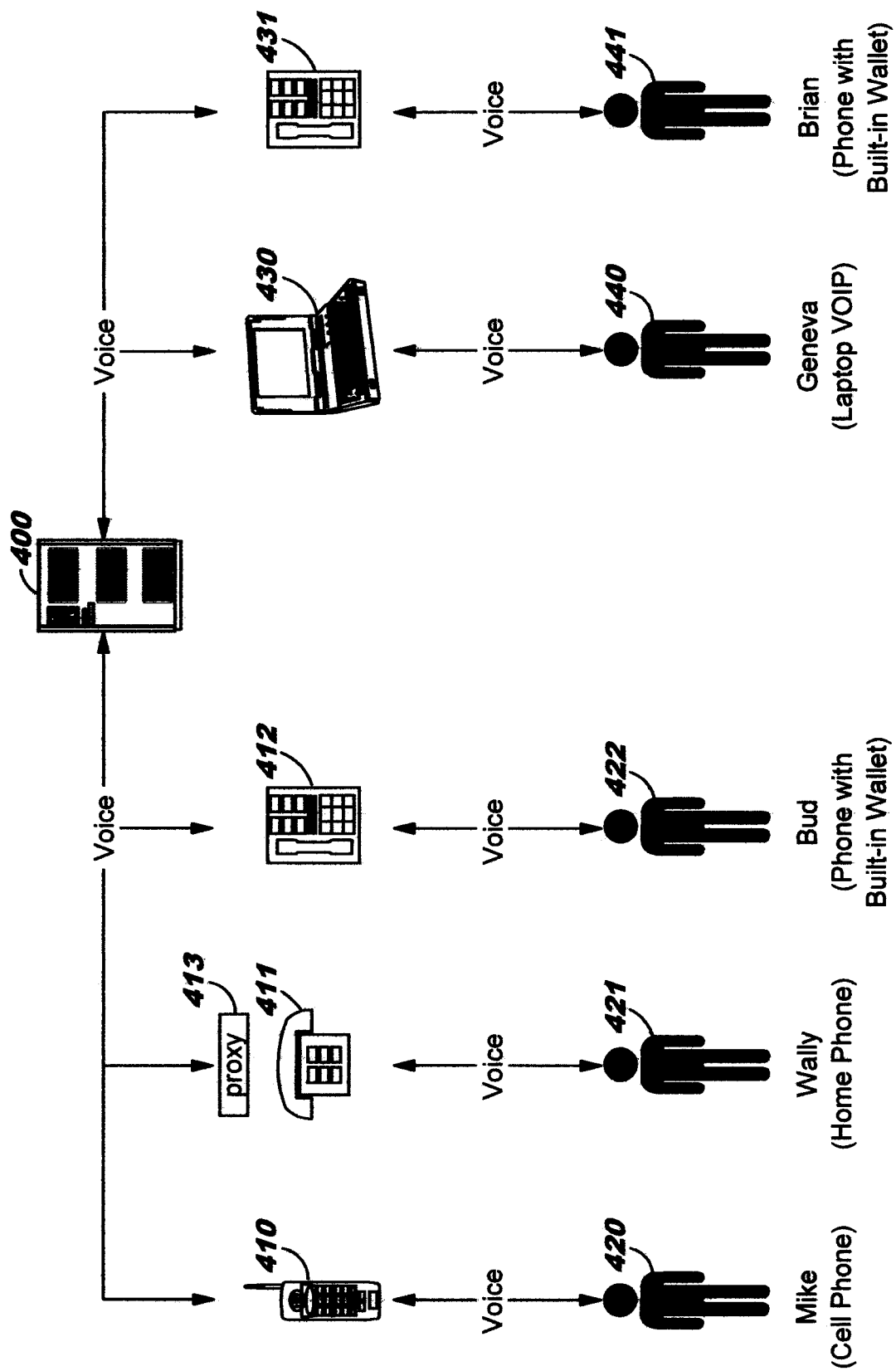
FIGS. 4-5 illustrate an example scenario, showing how an embodiment of the present invention might be used in a multi-party voice communication.
Figure 5:
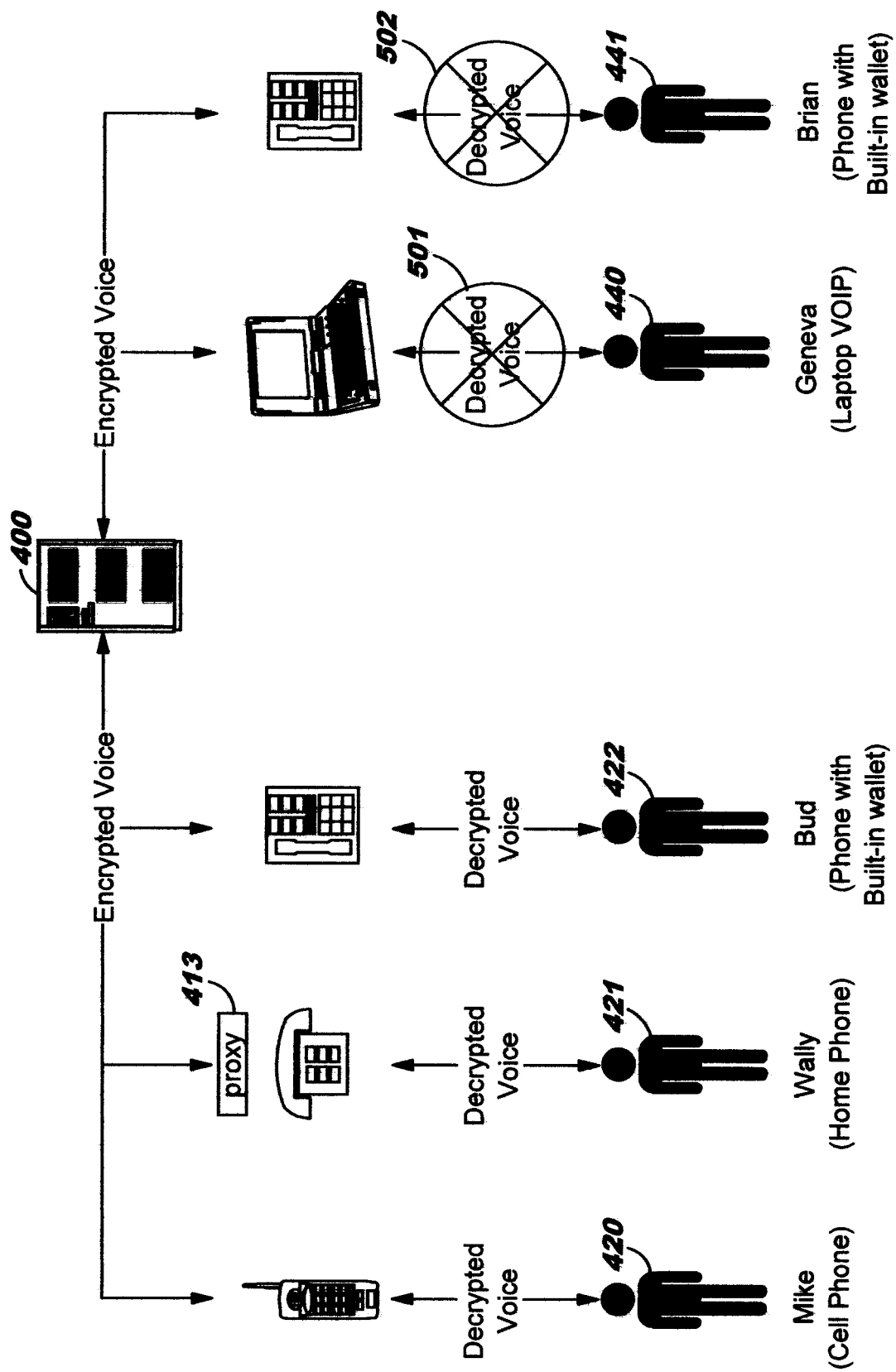

An example scenario will now be described, with reference to FIGS. 4 and 5, illustrating how an embodiment of the present invention might be used in a multi-party voice exchange.

Suppose that Fasteners, Inc. ("FI") in is negotiations with Hardware Distributors ("HD") to distribute their product, and that the two companies agree to have a conference call to negotiate terms. An embodiment of the present invention enables the participants to dynamically select segments of the multi-party exchange for obfuscation, such that the participants from FI may communicate privately among themselves over the multi-party communication channel and/or the participants from HD may communicate privately over this same multi-party channel, while each of the participants can hear segments that are not obfuscated.

Referring now to FIG. 4, participants from HD are shown at 420, 421, 422 and participants from FI are shown at 440, 441. The participants, in this example, will call in from multiple locations to a single multi-party conference call using a variety of different types of device (and notably, the participants from a company are not co-located). Features of these devices that pertain to an embodiment of the present invention will be described, by way of illustration but not of limitation.

Mike 420 is calling from his cell phone 410. The device ID of this cell phone 410, which may be stored in the SIMM card of the phone, is used to uniquely identify this cell phone device. The phone 410 includes specialized hardware and software to store keys and perform encryption and decryption, in this example. Wally 421 is calling from his home phone 411. This phone 411 is a legacy phone, and therefore uses a device proxy 413 that stores keys and performs encryption and decryption. The proxy 413 may comprise an attached dongle that is physically located between the phone and the wall jack, where this dongle stores the keys and has software for performing encryption and decryption, in this example. (As another alternative, a proxy port might be provided on conferencing bridge 400, and Wally's phone might connect to this proxy port which would then handle keys and encryption/decryption on Wally's behalf) Bud 422 calls in to the conference call from a conference room phone 412. This phone 412 has built-in hardware and software that is used to store keys and perform encryption and decryption.

Geneva 440 is using a VoIP phone connected to a computer 430. In this example, she is running software on her VoIP phone to perform key management as well as encryption and decryption. Brian 441 is using a conferencing phone 431 at FI headquarters, in this example, and phone 431 has built-in hardware and software of the type described for phone 412.

Suppose that a conference call moderator at HD will arrange the conference call. This conference call moderator therefore builds a list of invited participants, and sends each invited participant the call-in number and passcode. The call-in number identifies a conference calling system, referred to hereinafter as a conferencing bridge (illustrated at 400 in FIG. 4), that implements an embodiment of the present invention.

In an embodiment of the present invention, each participant registers the device that will he will use during this particular conference call, and this registration process occurs prior to beginning the conference call. Preferably, the registration is carried out at the conferencing bridge 400, and comprises calling a phone number associated with this conferencing bridge. (This registration call may use the same, or a different, phone number as the actual conference call.) The conferencing bridge obtains the unique device characteristic of the calling device, as well as the user-provided data for the currently-logged-on user of that calling device. As a result, the registration process uniquely identifies a combination of a device and its user (for example, by providing a MAC address 100 associated with the device and the device user's password 101, as illustrated in FIG. 1).

As noted earlier, a public/private obfuscation key pair is generated on each device, and the private obfuscation key is encrypted and securely stored in a wallet on that device. Some devices may securely store the private obfuscation key as encrypted by more than one symmetric key (i.e., where each of these symmetric keys corresponds to a potential user of the device; see the discussion of symmetric key 120, above, which has a user log-on credential 101 as an input). A particular user might also have an encrypted copy of a device's private obfuscation key at more than one device, and this allows that user to participate in private communications for a particular group from multiple devices. A user might also be a member of more than one group, and in this case, uses the private obfuscation key recovered from the wallet of his current device to decrypt the group key from any descriptors that correspond to this user's group membership and that have a member ID that can be matched to this user. The registration process of an embodiment of the present invention enables determining which user is associated with a particular device, and because an invited participant might call in from different devices for different calls, also enables determining which device a particular user will call in with for this conference call. The correct public obfuscation key to use for this conference call participant (i.e., the public obfuscation key associated with the participant's current call-in device, which may be used for encrypting a group key on behalf of this participant) can therefore be determined.

As each participant calls in to the conference call, a session is established between that participant's device and the conferencing bridge. Optionally, these sessions may be encrypted. Note, however, that this encryption (which is known in the art and protects all communications in the conference call from sniffers that might be placed on the communication media by a non-participant in the call) is distinct from the selective obfuscation disclosed herein, which pertains to encrypting portions of the communication for decryption by a subset of the participants (and embodiments of the present invention may work within a session that is encrypted using such prior art techniques, or within a session that is not encrypted in this manner).

When a conference call participant speaks, his voice is sent to the bridge over the phone line connected to his device or by using a VoIP session, in this example. The speaker's communication device (or its proxy; subsequent references to the device should be interpreted as including the proxy as an alternative, unless the context indicates otherwise) checks to see if this utterance is to be encrypted as an obscured segment. By default, the utterance is to be unencrypted, and is sent to the conferencing bridge where it is forwarded to all other conference call participants with normal blending (where "normal blending" refers to known techniques for mixing together voice data from all concurrent speakers). All participants to the multi-party exchange therefore hear these utterances. This unencrypted approach is the scenario shown in FIG. 4.

After some discussions have taken place, suppose that a participant from FI makes a proposal for some term being negotiated. Further suppose that Bud 422 is a marketing representative for HD, and believes that the proposed term from FI is not good enough. Bud therefore consults a list of commands recognized by an embodiment of the present invention, and determines that the so-called "pound key" ("#") is configured to signal Bud's communication device that an encrypted segment is coming. Bud also determines, by consulting a list of group identifiers associated with previously-established groups, that the number 5 is associated with a group having, as its members, Mike 420 and Wally 421.

Accordingly, Bud presses "#5" on his phone 412, and then begins speaking. The "#5" sequence signals Bud's communication device to send descriptors for group number 5 on the control channel and to begin encrypting Bud's utterances for transmission on the data channel. The bridge also stops blending speakers responsive to detecting the descriptors on the control channel. The descriptors sent on the control channel, in this example, comprise one descriptor for Mike 420 and another descriptor for Wally 421. And, although the phones 430 of Geneva and 431 of Brian receive these descriptors on the control channel and also receive the now-encrypted segment on the data channel, neither of these phones 430, 431 can decrypt the group key from the descriptors or the encrypted segment. This is the scenario illustrated in FIG. 5, where a symbol comprising an "X" in a circle is placed at 501, 502 to signify that the obscured segment cannot be heard by the users 440, 441. Phones 430, 431 preferably substitute a filler pattern for the encrypted segment, as discussed earlier.

In one approach, Bud continues to press the "5" key as long as he wishes for his utterances to be heard only by the members of the selected group. In another approach, a separate key may be used to signal the communication device that the private utterances have ended, in which case the initial keys ("#" and "5", in this example) may be released while Bud speaks his private utterances.

As has been stated, the phones used by Mike and Wally provide a password or other log-on credential of the user to thereby recreate the symmetric key illustrated at 120 of FIG. 1, and this recreated symmetric key is used to decrypt the private obfuscation key stored in the wallet on each user's phone. And, because their phones can decrypt the group key from their respective descriptors on the control channel using these recovered private obfuscation keys and then use this decrypted group key to decrypt the encrypted segment on the data channel, Mike and Wally are able to hear Bud's private communication to them (even though, as has been stated, these group members are not in the same room with Bud and instead are receiving Bud's utterances over the multi-party connection).

It may happen that Mike 420 stops participating in the conference call at some point (e.g., due to another commitment). Suppose Mike is the member for which descriptor 230 of FIG. 2 was created. In this scenario, the descriptor 230 is still transmitted (assuming that Bud continues using the same group identifier "5", in this example), but this descriptor 230 effectively goes unused because its member ID 231 is not matched; none of the remaining conference call participants is using the device that has the private obfuscation key needed to decrypt the group key from that descriptor; and none of those remaining conference call participants has Mike's password 101 on the device having the MAC address 100 for recreating the symmetric key that would decrypt that private obfuscation key.

Instead of identifying a group of which Mike and Wally are members, Bud might alternatively identify a different group, or specific individuals (who may be represented as a group comprising a single member), as the permitted recipients of his private communication. An embodiment of the present invention also enables Bud to change from providing private communications for one identified group of recipients to providing private communications for a different group during the course of a single multi-party exchange. Preferably, this comprises providing, for each different group, a key sequence as described above that signals the conferencing bridge that a private communication will follow and that also identifies the group of intended recipients for that private communication. (While the example herein identifies a group using a single digit, this is by way of illustration and not of limitation.)

When Bud finishes speaking, another group member may provide a private response by pressing a key sequence to signal his or her communication device, in a similar manner to that which has been described. Wally 421, for example, might press a key sequence "#6" to identify a group comprising Mike 420 and Bud 422 in order to privately respond to the utterances Bud has just made privately. Responsive to receiving this signal, the proxy 413 used with Wally's legacy phone 411 sends out descriptors for Mike and Bud on the control channel and encrypts Wally's utterances on the data channel.

After some discussion among the participants from HD, the HD team terminates its private exchange and makes a counter-proposal which is not encrypted using any group key and is therefore audible to Geneva 440 and Brian 441 (as well as to the members of the HD team). The FT team members accept this counter-proposal, and after some further discussion, the conference call ends.

An embodiment of the present invention may provide for more than one group to have "sub-talk" (i.e., obfuscated communications) occurring over the communication channel at a particular time. For example, Geneva 440 and Brian 441 might be conducting their own private exchanges over the multi-party communication channel during the time that the HD team is communicating privately (over that same multi-party communication channel) by signalling from their phones 430, 431 and providing their own group identifier(s). It should also be noted that Geneva and Brian cannot maliciously intercept the private communications initiated by Bud by providing the same group number "5" used by Bud to identify Mike and Wally as intended recipients. This is because the group key in the descriptors sent on the control channel responsive to identifying group "5" cannot be decrypted by the phones 430, 431 of Geneva or Brian, as has been discussed.

Figure 6:
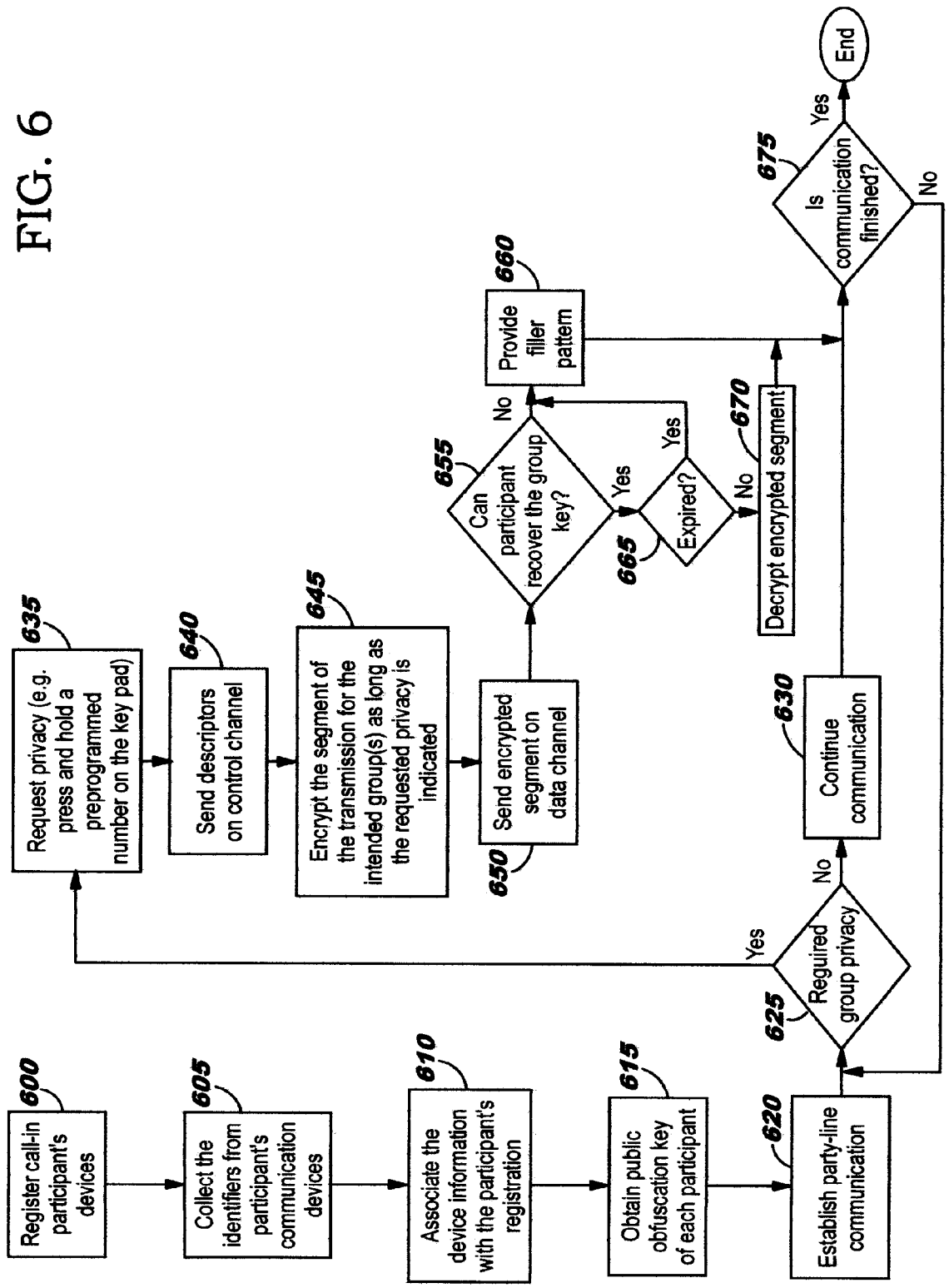
FIG. 6 provides a flowchart depicting logic which may be used when implementing an embodiment of the present invention.

Referring now to FIG. 6, a flowchart is provided depicting logic that may be used when implementing an embodiment of the present invention. This flowchart summarizes information that has been discussed. Block 600 indicates that a participant for a conference call registers his device with the conferencing bridge. Identifiers from the devices are obtained (Block 605), and preferably comprise the device-specific characteristics and user-provided data as discussed above. This information is preferably recorded (Block 610), in association with the registered device information, for use in exchanging private communications as described herein.

At Block 615, the public obfuscation keys for each participant are obtained. This may comprise using information obtained at Block 605 to consult a repository where the public obfuscation keys were stored when previously published. Or, these keys may be published during the registration or initialization of the conference call. The multi-party exchange is then initiated (Block 620), using a multi-party communication channel (referred to in FIG. 6 as a "party-line communication").

Blocks 625-675 comprise an iterative process that executes during the ongoing conference call. Block 625 tests whether an upcoming segment requires privacy handling for a particular subset of the participants (i.e., such that the segment is only perceptible by members of a particular group or groups). If this test has a negative result, then the communications will be perceptible to all participants and are sent without obfuscation (Block 630). On the other hand, if this test has a positive result, then control transfers to Block 635 where a participant who wishes to initiate this private exchange requests the privacy processing. With reference to the example presented above in FIGS. 4-5, Block 635 corresponds to pressing the "#5" key sequence on Bud's phone. This key sequence (or a key from the key sequence) may be held down during the utterance of the private segment (as noted in Block 635), or a separate termination key (or key sequence) may be used (not illustrated in FIG. 6), as has been discussed.

Responsive to receiving this signal, the receiving device sends descriptors for all members of the permitted group(s) on the control channel (Block 640), and encrypts the segment using the group key (Block 645) and transmits that segment on the data channel (Block 650). Note that if the person initiating the private communication identifies more than one group of permitted recipients, an embodiment of the present invention responds by sending descriptors for each member of each group on the control channel and sending the encrypted segment on the data channel, where the encrypted segment has been encrypted using a "group key" that will be shared by all of the permitted groups. That is, the members of the permitted groups will all recover the same key value from their descriptors, and can use this key to decrypt the encrypted segment. As an alternative to sharing a group key among multiple groups in this manner, an alternative embodiment sends duplicate copies of the encrypted segment on the data channel, where these duplicate copies of the encrypted segment have each been encrypted using a different group key (i.e., a separate group key for each separate one of the permitted groups).

Block 655 tests whether a participant can recover the group key at the participant's device. If not, then at Block 660, a filler pattern is provided in place of the obscured segment. If the test at Block 655 has a positive result, on the other hand, then Block 665 tests whether the timestamp has expired. If this test at Block 665 has a positive result, then the segment cannot be decrypted and a filler pattern is provided instead by transferring control to Block 660; otherwise, when the test at Block 665 has a negative result, the segment is decrypted (Block 670) and provided to the participant. Following the processing at either Block 660 or Block 670, processing continues at Block 675, which tests whether the communication is finished. If it is not, control loops back to Block 625; otherwise, the processing of FIG. 6 exits.

Note that the subset of participants to whom a private communication is directed may be changed each time the logic in Blocks 625-675 is executed during a particular conference call, if desired. A different key or key sequence may be entered at Block 635 to identify this different subset. And, when more than one subset of participants is identified during a particular conference call, it may happen that a participant is a member of more than one of the identified subsets. In this case, the member can recover the group key and decrypt the encrypted segments that are directed to each subset of which he is a member.

In an embodiment directed to a multi-party chat environment, techniques disclosed herein may be used to enable a person typing an instant message to limit permitted recipients of that message to a subset of the participants who are active in this chat session. The person typing the message may signal a chat client device in a chat session that this message is intended for members of a particular group, for example by typing a special control sequence with which the chat client is configured, in a similar manner to that which has been described above for signaling during a conference call. The chat client device may then create descriptors for those group members, obscure the typed message, and send the descriptors and the obscured message to a chat session server handling the chat session for forwarding to all of the active participants in the chat session. Only the devices in use by the members of the identified group will be able to recover the group key from the descriptors, and then use this recovered group key to decrypt the obscured message (as has been described above with reference to a multi-party voice exchange environment): other devices preferably render a filler pattern, such as a black bar, instead of the obscured message. (Alternatively, for a legacy chat device, the legacy client may work with a proxy in a manner similar to that described above with reference to legacy phone 411, and in one approach, the chat server may perform this proxy function.)

In an embodiment directed to data stored in a log, techniques disclosed herein may be used to enable selected viewers of that log to see private data recorded therein while other viewers are not allowed to see that private data (and instead see a filler pattern such as "PRIVATE", or perhaps a white space or an area where a text string has been compressed to a blank, and so forth). Suppose, for example, that an application program in a banking environment generates a log file for banking transactions. It is necessary for some viewers of the log file to see the full details recorded for the transactions. For example, bank auditors need to see these details. On the other hand, if the banking application crashes or otherwise needs to be debugged, the log file may provide pertinent information about what has been occurring as the banking application executes. A software developer may therefore need to inspect the log file. It is unlikely that this software developer, however, needs to see every detail from the log file records: he may be able to perform his debugging task without seeing private information such as the account balance information from the banking transactions, or perhaps user PIN numbers recorded as a user interacts with an automated teller machine, and so forth. Accordingly, a group key of the type discussed above can be created for permitted viewers of the private information, with corresponding member-specific descriptors containing the group key encrypted therein. Notably, in this example, the software developer does not have a corresponding descriptor, and therefore can only view the unobscured information. If the log file is to be viewed by an external auditor, on the other hand, then the auditor can be identified as a group member and will be able to recover the group key from his corresponding descriptor. In one approach, the log file is generated without obscured information, and the obscuring occurs as a copy of the log file is being created for use by a device other than the one on which the log file was originally created (where this original recording device may be protected, for example, by physical security within the confines of the bank). In another approach, the log file is initially generated with the private data obscured, and only permitted group members will be able to view that private data while all others will preferably see a filler pattern of some type in place of each obscured field.

An embodiment directed to selectively obfuscating white-board updates in a web conference environment may comprise signaling a white-board client device in a white-board session that upcoming operations on the white-board are to be obscured, and providing an identifier of a group of permitted viewers of that obscured information. The white-board client device preferably generates descriptors and sends those to a white-board server that manages the white-board session for forwarding to each session participant, and also sends the as-obscured white-board updates to the white-board server for forwarding to those session participants as well, in a manner analogous to that which has been described for sending information to participants in a multi-party voice exchange. (Alternatively, for a legacy client device, the legacy client may work with a proxy in a manner similar to that described above with reference to legacy phone 411, and in one approach, the white-board server may perform this proxy function.) Selected participants might be allowed to see private notations made on the white-board in this manner, for example, using techniques disclosed herein.

Participants in other types of multi-party communications may selectively obscure segments of those communications using the disclosed techniques. People communicating using push-to-talk technology, for example, may use the disclosed techniques to limit who can hear an upcoming spoken communication, and then switch back to including all active participants in the spoken communication by terminating the obfuscation. And, data transmitted to subscribers using RSS or similar techniques can be partially obscured, so that only a subset of the recipients (such as those who have paid a fee or premium, for example) is able to perceive all of the transmitted data, using techniques disclosed herein. In this latter scenario, the data used as the source for the transmission may have the protected portions obscured while the data is being transmitted to the subscribers, or it may be originally stored in obscured form, in a manner analogous to that of the log file scenario described earlier.

Similarly, sensitive portions of any recorded information may be obscured using techniques disclosed herein. Conversations or other data might be securely archived, for example. That is, only a member of a permitted group can recover the group key for decrypting the archived information. In combination with a variation that provides an expiration timestamp, as discussed above, an embodiment of the present invention can limit the time period in which such archived information can be retrieved (and such time limits may be used in a similar manner with other ones of the environments in which an embodiment of the present invention may be deployed).

An embodiment of the present invention transmits cryptographic key information that enables permitted recipients to decrypt obfuscated segments, as has been described. Notably, the full set of cryptographic key information is not transmitted when using an embodiment of the present invention. Instead, portions of the cryptographic key information resides at the recipient devices (as has also been described). While discussions herein pertain to a user's log-on identifier and password, an embodiment of the present invention may alternatively use additional or different types of information as the user-provided data with which the present invention operates.

For example, a directory entry might store the network ID of Bud's workstation device, Bud's log-on ID and password as used with that device, and Bud's social security number and employee number. Or, an asset management system might record the serial number of Bud's assigned workstation and Bud's employee badge number. One or more of these types of information might be provided from Bud's workstation as he registers that workstation for participation in a multi-party exchange. When Bud's workstation then connects to a coordinator system for the multi-party exchange, information stored in Bud's workstation can be submitted to that coordinator system to inform it of the particular device that will be connecting and the user of the device. If the workstation serial number is associated with Bud's badge number in an asset management system, for example, then Bud may be presumed as the user when the coordinator system has access to the asset management system and detects the workstation serial number as an active participant connecting to the multi-party exchange.

As another example, a conferencing bridge might be configured with a list of expected participants for a conference call, and might consult a directory to obtain stored identifying information for those participants. Suppose the directory stores Bud's user ID and corresponding password for 5 different applications, as well as a list of MAC addresses of Bud's commonly-used devices. Upon detecting one of those MAC addresses calling in to the conference call, the conferencing bridge might inspect information from Bud's currently-used device to determine which user ID and password pair he has used to log in to that device.

A directory or other repository might be accessed to determine a group member ID to use for a particular participant, and/or to determine whether identifying information for a participant "matches" any of the member IDs in the descriptors. For example, for a group comprising members of a department, the members might be identified using their employee serial numbers. It is unlikely that these employee serial numbers would be used as the log-on ID or the password for the department members as they use their various communication devices. Accordingly, a directory may store a mapping between the ID with which a group member is identified for purposes of group membership and one or more IDs with which that group member can be identified using log-on information.

As will be appreciated by one of skill in the art, embodiments of the present invention may be provided as (for example) methods, systems, and/or computer program products. The invention can take the form of an entirely hardware embodiment, an entirely software embodiment, or an embodiment containing both hardware and software elements. The hashing, encryption, and/or decryption functions discussed above may be implemented using hardware elements, for example, and techniques for providing such functions in this manner are understood by those in the art. When implemented in software, such software may be provided as (but is not limited to) firmware, resident software, microcode, etc. Furthermore, the present invention may take the form of a computer program product which is embodied on one or more computer-usable storage media (including, but not limited to, disk storage, CD-ROM, optical storage, and so forth) having computer-usable program code embodied therein, where this computer program product may be used by or in connection with a computer or any instruction execution system. For purposes of this description, a computer-usable or computer-readable medium can be any apparatus that can contain, store, communicate, propagate, or transport the program for use by or in connection with the instruction execution system, apparatus, or device.

The medium may be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory ("RAM"), a read-only memory ("ROM"), a rigid magnetic disk, and an optical disk. Current examples of optical disks include compact disk read-only memory ("CD-ROM"), compact disk read/write ("CD-R/W"), and DVD.

Figure 7:
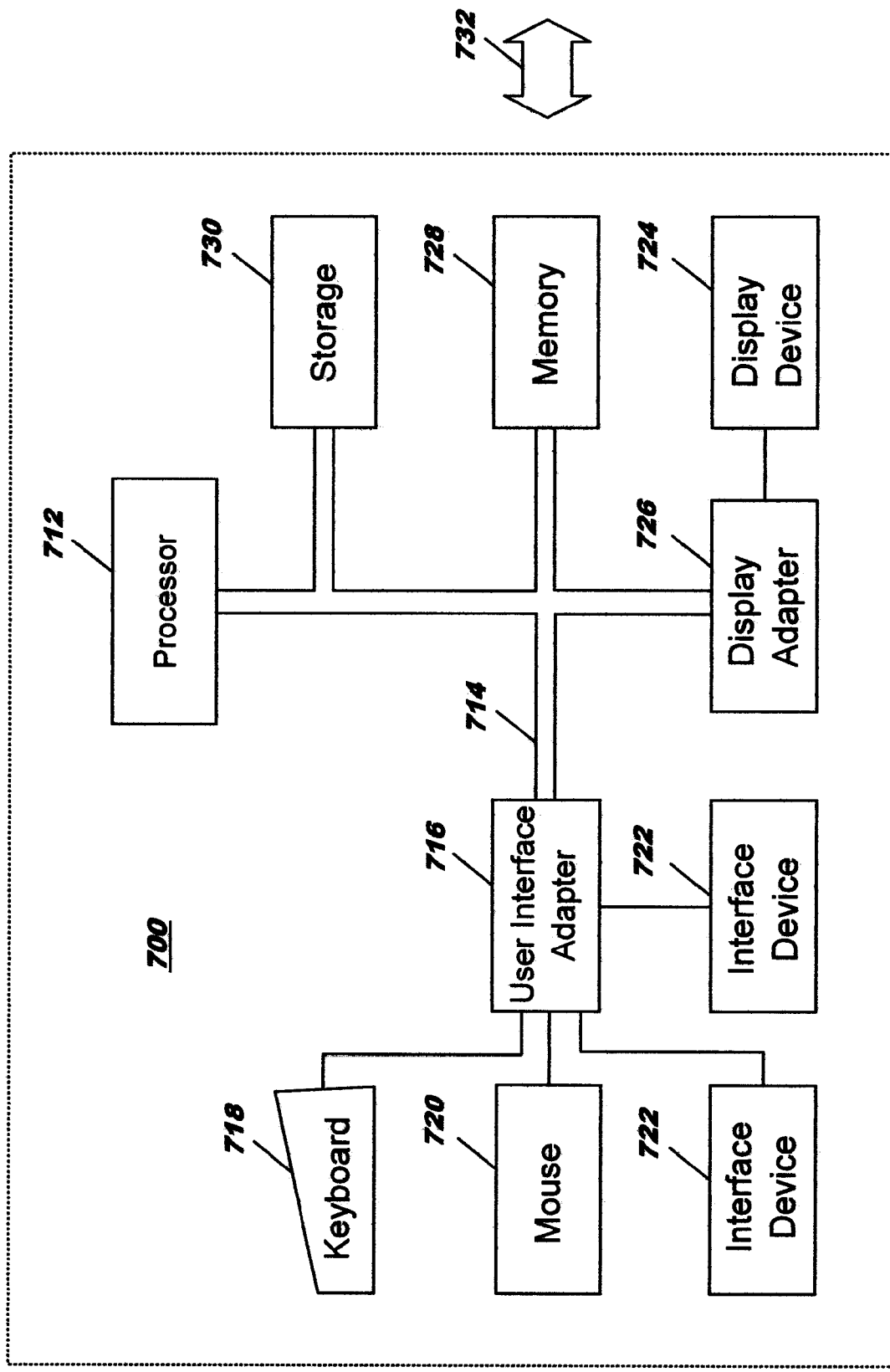
FIG. 7 depicts a data processing system suitable for storing and/or executing program code.

Referring now to FIG. 7, a data processing system 700 suitable for storing and/or executing program code includes at least one processor 712 coupled directly or indirectly to memory elements through a system bus 714. The memory elements can include local memory 728 employed during actual execution of the program code, bulk storage 730, and cache memories (not shown) which provide temporary storage of at least some program code in order to reduce the number of times code must be retrieved from bulk storage during execution.

Input/output ("I/O") devices (including but not limited to keyboards 718, displays 724, pointing devices 720, other interface devices 722, etc.) can be coupled to the system either directly or through intervening I/O controllers or adapters (716, 726).

Network adapters may also be coupled to the system to enable the data processing system to become coupled to other data processing systems or remote printers or storage devices through intervening private or public networks (as shown generally at 732). Modems, cable modem attachments, wireless adapters, and Ethernet cards are just a few of the currently-available types of network adapters.

Figure 8:
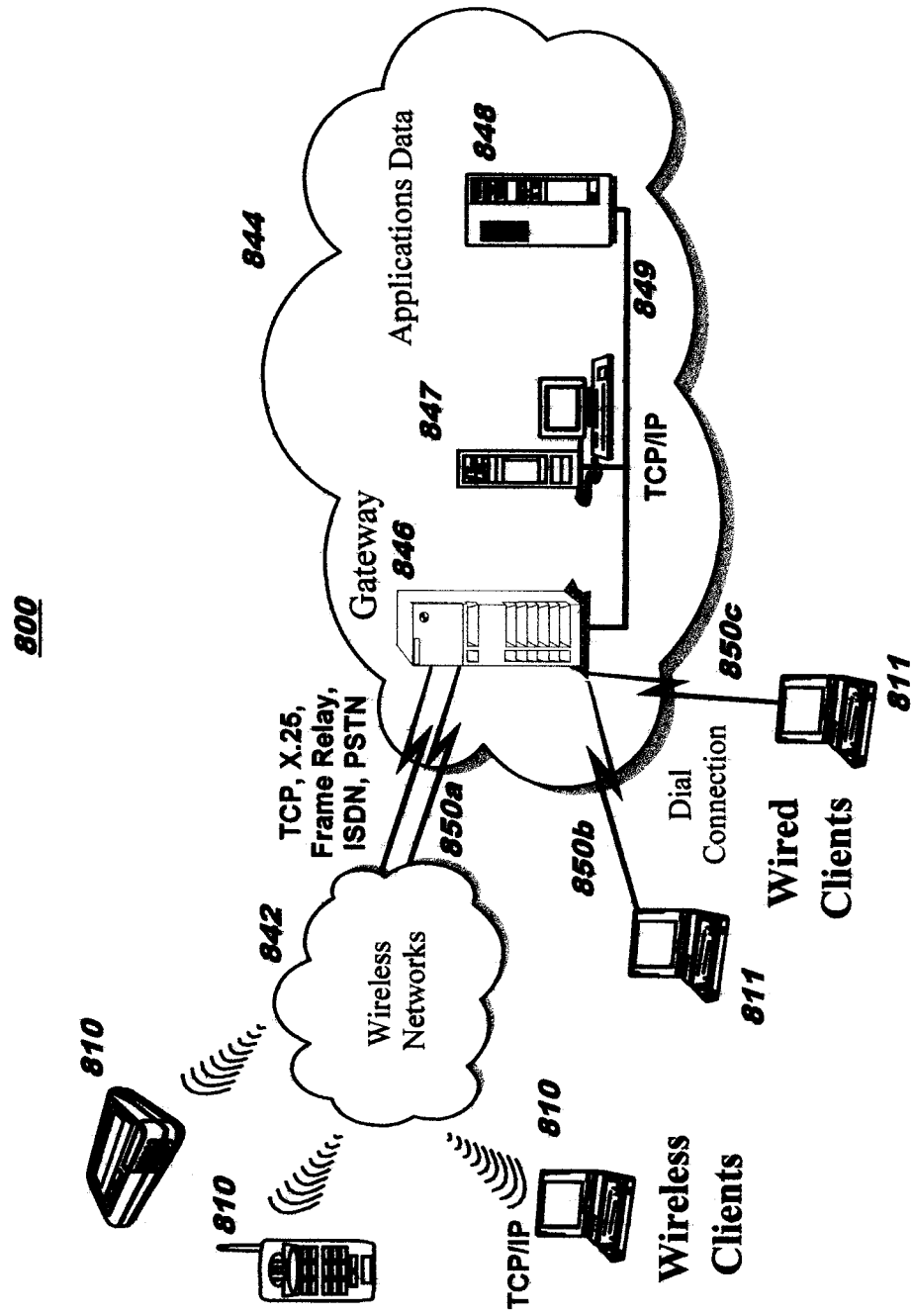
FIG. 8 depicts a representative networking environment in which one or more embodiments of the present invention may be used.

FIG. 8 illustrates a data processing network environment 800 in which the present invention may be practiced. The data processing network 800 may include a plurality of individual networks, such as wireless network 842 and network 844. A plurality of wireless devices 810 may communicate over wireless network 842, and a plurality of wired devices, shown in the figure (by way of illustration) as workstations 811, may communicate over network 844. Additionally, as those skilled in the art will appreciate, one or more local area networks ("LANs") may be included (not shown), where a LAN may comprise a plurality of devices coupled to a host processor.

Still referring to FIG. 8, the networks 842 and 844 may also include mainframe computers or servers, such as a gateway computer 846 or application server 847 (which may access a data repository 848). A gateway computer 846 serves as a point of entry into each network, such as network 844. The gateway 846 may be preferably coupled to another network 842 by means of a communications link 850a. The gateway 846 may also be directly coupled to one or more workstations 811 using a communications link 850b, 850c, and/or may be indirectly coupled to such devices. The gateway computer 846 may be implemented utilizing an Enterprise Systems Architecture/390® computer available from IBM. Depending on the application, a midrange computer, such as an Application System/400® (also known as an AS/400®) may be employed. ("Enterprise Systems Architecture/390", "Application System/400", and "AS/400" are registered trademarks of IBM in the United States, other countries, or both.)

The gateway computer 846 may also be coupled 849 to a storage device (such as data repository 848).

Those skilled in the art will appreciate that the gateway computer 846 may be located a great geographic distance from the network 842, and similarly, the wireless devices 810 and/or workstations 811 may be located some distance from the networks 842 and 844, respectively. For example, the network 842 may be located in California, while the gateway 846 may be located in Texas, and one or more of the workstations 811 may be located in Florida. The wireless devices 810 may connect to the wireless network 842 using a networking protocol such as the Transmission Control Protocol/Internet Protocol ("TCP/IP") over a number of alternative connection media, such as cellular phone, radio frequency networks, satellite networks, etc. The wireless network 842 preferably connects to the gateway 846 using a network connection 850a such as TCP or User Datagram Protocol ("UDP") over IP, X.25, Frame Relay, Integrated Services Digital Network ("ISDN"), Public Switched Telephone Network ("PSTN"), etc. The workstations 811 may connect directly to the gateway 846 using dial connections 850b or 850c. Further, the wireless network 842 and network 844 may connect to one or more other networks (not shown), in an analogous manner to that depicted in FIG. 8.

The present invention has been described with reference to flow diagrams and/or block diagrams according to embodiments of the invention. It will be understood that each flow and/or block of the flow diagrams and/or block diagrams, and combinations of flows and/or blocks in the flow diagrams and/or block diagrams, can be implemented by computer program instructions. These computer program instructions may be provided to a processor of a general purpose computer, special purpose computer, embedded processor, or other programmable data processing apparatus to produce a machine, such that the instructions, which execute via the processor of the computer or other programmable data processing apparatus, create means for implementing the functions specified in the flow diagram flow or flows and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flow diagram flow or flows and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flow diagram flow or flows and/or block diagram block or blocks.

While embodiments of the present invention have been described, additional variations and modifications in those embodiments may occur to those skilled in the art once they learn of the basic inventive concepts. Therefore, it is intended that the appended claims shall be construed to include the described embodiments and all such variations and modifications as fall within the spirit and scope of the invention. Furthermore, while the discussion herein may refer to "an embodiment" or "one embodiment" of the present invention, such references are not necessarily discussing the same embodiment.

The invention claimed is:

1. A computer-implemented method of selectively obfuscating information in a multi-party voice communication, comprising using a processor of a computer for:
   receiving a signal, during an ongoing multi-party voice communication, from a device with which a selected one of a plurality of participants is participating in the multi-party voice communication, the signal indicating that a next utterance from the selected participant is to be transmitted as an obfuscated segment in the ongoing multi-party voice communication; and
   responding to the signal, during the ongoing multi-party voice communication, comprising:
      determining, from among the plurality of participants, a subset of the participants selected to perceive the obfuscated segment;
      using a participant-specific encryption key, for each of the subset of participants, to encrypt a group-specific decryption key;
      creating, from the encrypted group-specific decryption key for each of the subset of participants, a descriptor structure in which the encrypted group-specific decryption key for each of the participants in the subset is identified with a corresponding identifier of the participant;
      obfuscating the next utterance as an obfuscated segment by encrypting the next utterance using a group-specific encryption key that corresponds to the group-specific decryption key; and
      transmitting the obfuscated segment, and the descriptor structure, to each of the plurality of participants in the multi-party voice communication, thereby enabling each of the participants in the subset to decrypt and perceive the obfuscated segment while preventing remaining ones of the participants of the multi-party voice communication from decrypting and perceiving the obfuscated segment.

2. The method according to claim 1, wherein the transmission of the obfuscated segment occurs on a data channel used for transmitting all segments of the multi-party voice communication and the transmission of the descriptor structure occurs on a control channel of the multi-party voice communication.

3. The method according to claim 1, wherein at least one segment transmitted to the plurality of participants of the multi-party voice communication prior to the transmitting of the obfuscated segment is not obfuscated and is therefore perceptible to all of the plurality of participants.

4. The method according to claim 1, wherein the group-specific decryption key comprises a symmetric key that is recoverable, for decrypting the obfuscated segment, at a device used by each of the participants in the subset but is not recoverable at a device used by any of the remaining ones of the participants.

5. The method according to claim 1, wherein the signal is received, from the device with which the selected one of the participants is participating, responsive to the selected one activating a predetermined key sequence on the device.

6. The method according to claim 1, wherein each of the participants in the subset is enabled to perceive the next utterance, responsive to recovering the group-specific decryption key from the transmitted descriptor structure using a participant-specific decryption key that corresponds to the participant-specific encryption key of the participant and using the recovered group-specific decryption key to decrypt the obfuscated segment, and each of the remaining ones of the participants is provided with a filler pattern to perceive in place of perceiving the next utterance.

7. The method according to claim 1, wherein the signal serves to dynamically identify the utterance during the multi-party voice communication.

8. The method according to claim 7, wherein the device with which the selected one of the participants is participating comprises a phone device.

9. The method according to claim 1, wherein the multi-party voice communication is a multi-party push-to-talk communication and the next utterance is a dynamically-identified spoken message that is spoken during the multi-party push-to-talk communication.

10. The method according to claim 1, wherein:
the group-specific decryption key is a symmetric key that is identical to the group-specific encryption key; and
the symmetric key is made specific to a particular session of the multi-party voice communication by combining a session-specific identifier of the multi-party voice communication with a group-specific symmetric key that is associated with the subset.

11. The method according to claim 10, wherein:
the multi-party voice communication comprises a conference call; and
the session-specific identifier comprises a conference call-in passcode of the conference call.

12. The method according to claim 1, wherein the multi-party voice communication is transmitted over a data network.

13. The method according to claim 12, wherein the data network comprises a Voice Over Internet Protocol network.

14. The method according to claim 1, wherein responding to the signal continues until receiving a next signal from the selected one of the participants, the next signal indicating that subsequent utterances from the selected one are to be transmitted as un-obfuscated segments in the ongoing multi-party voice communication.

15. A method of selectively obfuscating information in a multi-party voice communication, comprising using a processor of a computer for:
receiving a signal, during an ongoing multi-party voice communication, from a device with which a selected one of a plurality of participants is participating in the multi-party voice communication, the signal indicating that a next utterance from the selected participant is to be treated as a private segment in the ongoing multi-party voice communication; and
responding to the signal, during the ongoing multi-party voice communication, comprising:
determining a subset of the plurality of participants in the multi-party voice communication who are to receive, in a perceptible form, the private segment;
obfuscating the private segment by encryption using a group key corresponding to the subset;
encrypting a copy of the group key for each of the participants in the subset, such that the group key is only recoverable by each of the participants in the subset using the participant's encrypted copy of the group key and is not recoverable, from any of the encrypted copies of the group key, by any of the participants not in the subset;
creating, from the encrypted copies of the group key, a descriptor structure in which the encrypted copy of the group key for each of the participants in the subset is identified with a corresponding identifier of the participant; and
transmitting the obfuscated private segment, and the descriptor structure, to all of the plurality of the participants in the multi-party voice communication, whereby each of the participants in the subset can decrypt the transmitted obfuscated private segment, upon receipt thereof, using the group key recovered by the participant from the participant's encrypted copy of the group key in the descriptor structure but none of the participants not in the subset can decrypt the transmitted obfuscated private segment upon receipt thereof.

16. The method according to claim 15, wherein:
a session-specific identifier of the multi-party voice communication is associated with each separate session of the multi-party voice communication, and is known to each of the plurality of participants in the multi-party voice communication;
the obfuscating further comprises combining the group key corresponding to the subset with the session-specific identifier of the multi-party voice communication to create a session-specific version of the group key, and using the session-specific version of the group key to encrypt the private segment; and
each of the participants in the subset can decrypt the transmitted obfuscated segment, upon receipt of the transmitted obfuscated segment and the descriptor structure, using the session-specific version of the group key after recreating a local copy of the session-specific version of the group key by combining the group key recovered by the participant from the participant's encrypted copy of the group key in the descriptor structure with the session-specific identifier of the multi-party voice communication.

17. A computer program product for selectively obfuscating information in a multi-party voice communication, the computer program product embodied on one or more non-transitory computer-usable storage media and comprising computer-usable program code for:
receiving a signal, during an ongoing multi-party voice communication, from a device with which a selected one of a plurality of participants is participating in the multi-party voice communication, the signal indicating that a next utterance from the selected participant is to be treated as a private segment in the ongoing multi-party voice communication; and
responding to the signal, during the ongoing multi-party voice communication, comprising:
determining a subset of the plurality of participants in the multi-party voice communication who are to receive, in a perceptible form, the private segment;
obfuscating the private segment by encryption using a group key corresponding to the subset;
encrypting a copy of the group key for each of the participants in the subset, such that the group key is only recoverable by each of the participants in the subset with the participant's encrypted copy of the group key and is not recoverable, from any of the encrypted copies of the group key, by any of the participants not in the subset;
creating, from the encrypted copies of the group key, a descriptor structure in which the encrypted copy of the group key for each of the participants in the subset is identified with a corresponding identifier of the participant; and transmitting the obfuscated private segment, and the descriptor structure, to all of the plurality of the participants in the multi-party voice communication, whereby each of the participants in the subset can decrypt the transmitted obfuscated private segment, upon receipt thereof, using the group key recovered by the participant from the participant's encrypted copy of the group key in the descriptor structure but none of the participants not in the subset can decrypt the transmitted obfuscated private segment upon receipt thereof.

18. The computer program product according to claim 17, wherein the obfuscated segment has associated therewith an expiration timestamp, and wherein the transmitted obfuscated segment cannot be decrypted by any of the participants in the multi-party voice communication after the expiration timestamp expires.

19. The computer program product according to claim 17, wherein:

the encrypting a copy of the group key for each of the participants in the subset uses a participant-specific public key; and for each of the participants in the subset, the participant's encrypted copy of the group key is recovered from the descriptor structure using a participant-specific private key that corresponds to the participant-specific public key.

20. The computer program product according to claim 19, wherein the participant-specific private key for each of the participants in the subset is encrypted, at a device currently used by the participant for participating in the multi-party voice communication, with a symmetric encryption key created by combining hardware-specific information which uniquely corresponds to the currently-used device in combination with data provided by the participant and which is not transmitted to any of the participants in the multi-party voice communication, thereby enabling the participant-specific private key to be secured for storing at the currently-used device.

21. A system for selectively obfuscating information in a multi-party voice communication, comprising a computer comprising a processor and instructions which are executable, using the processor of the computer, for implementing functions comprising:

receiving a signal, during an ongoing multi-party voice communication, from a device with which a selected one of a plurality of participants is participating in the multi-party voice communication, the signal indicating that a next utterance from the selected participant is to be transmitted as an obfuscated segment in the ongoing multi-party voice communication; and responding to the signal, during the ongoing multi-party voice communication, comprising:

determining, from among the plurality of participants, a subset of the participants selected to perceive the obfuscated segment;

using a participant-specific encryption key, for each of the subset of participants, to encrypt a group-specific decryption key;

creating, from the encrypted group-specific decryption key for each of the subset of participants, a descriptor structure in which the encrypted group-specific decryption key for each of the participants in the subset is identified with a corresponding identifier of the participant;

obfuscating the next utterance as an obfuscated segment by encrypting the next utterance using a group-specific encryption key that corresponds to the group-specific decryption key; and transmitting the obfuscated segment, and the descriptor structure, to each of the plurality of participants in the multi-party voice communication, thereby enabling each of the participants in the subset to decrypt and perceive the obfuscated segment while preventing remaining ones of the participants of the multi-party voice communication from decrypting and perceiving the obfuscated segment.

22. The system according to claim 21, wherein the group-specific encryption key is a symmetric key and is identical to the group-specific decryption key.

* * * * *